US012066668B2

(12) United States Patent
Qi et al.

(10) Patent No.: US 12,066,668 B2
(45) Date of Patent: Aug. 20, 2024

(54) CONNECTOR ASSEMBLY AND OPTICAL-ELECTRICAL COMPOSITE CONNECTOR

(71) Applicant: Huawei Technologies Co., Ltd., Shenzhen (CN)

(72) Inventors: Biao Qi, Wuhan (CN); Feng Tang, Wuhan (CN); Jinxing Zhang, Haikou (CN); Bo Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 17/807,800

(22) Filed: Jun. 20, 2022

(65) Prior Publication Data
US 2022/0317384 A1 Oct. 6, 2022

Related U.S. Application Data

(63) Continuation of application No. PCT/CN2020/113528, filed on Sep. 4, 2020.

(30) Foreign Application Priority Data

Dec. 20, 2019 (CN) .......................... 201911344083.5

(51) Int. Cl.
*G02B 6/38* (2006.01)
*H01R 13/502* (2006.01)
(52) U.S. Cl.
CPC ......... *G02B 6/3825* (2013.01); *G02B 6/3858* (2013.01); *H01R 13/502* (2013.01)

(58) Field of Classification Search
CPC .... G02B 6/3825; G02B 6/3858; H01R 13/502
See application file for complete search history.

(56) References Cited

U.S. PATENT DOCUMENTS

| 5,142,600 A | 8/1992 | Ortiz, Jr. |
| 9,755,382 B2 * | 9/2017 | Gniadek ................ H01R 13/64 |
| 10,422,962 B2 * | 9/2019 | Coenegracht ........ G02B 6/3826 |

(Continued)

FOREIGN PATENT DOCUMENTS

| CN | 1682139 A | 10/2005 |
| CN | 101087052 A | 12/2007 |

(Continued)

*Primary Examiner* — Sung H Pak
(74) *Attorney, Agent, or Firm* — Slater Matsil, LLP

(57) ABSTRACT

A front housing of the optical-electrical composite connector is axially provided with a through groove passing through the front housing on the front housing, and an inner wall of the through groove is provided with a first groove. A rear housing includes a main body portion and a clamping portion connected to one end of the main body portion. An outer surface of the clamping portion is axially provided with a second groove, the clamping portion is located in the through groove, and the first groove is butted with the second groove to form an accommodation space. One end that is of the through groove and that is away from the main body portion is an optical port. The font housing is provided with an opening connecting to the accommodation space and the outside. The conductive terminal is accommodated in the opening, and the conductive terminal forms an electrical port.

20 Claims, 6 Drawing Sheets

(56) References Cited

U.S. PATENT DOCUMENTS

| | | | |
|---|---|---|---|
| 2006/0263011 A1* | 11/2006 | Chen | G02B 6/3888 385/75 |
| 2009/0175580 A1 | 7/2009 | Chen et al. | |
| 2011/0200286 A1 | 8/2011 | Smith et al. | |
| 2012/0302103 A1 | 11/2012 | Su et al. | |
| 2016/0285215 A1 | 9/2016 | Little et al. | |

FOREIGN PATENT DOCUMENTS

| | | | |
|---|---|---|---|
| CN | 101304143 A | 11/2008 |
| CN | 101447616 A | 6/2009 |
| CN | 201514499 U | 6/2010 |
| CN | 101907752 A | 12/2010 |
| CN | 201673281 | 12/2010 |
| CN | 201689193 U | 12/2010 |
| CN | 101988976 A | 3/2011 |
| CN | 102298175 A | 12/2011 |
| CN | 102540357 A | 7/2012 |
| CN | 102565956 A | 7/2012 |
| CN | 202383324 U | 8/2012 |
| CN | 203287565 U | 11/2013 |
| CN | 203587845 A | 5/2014 |
| CN | 103852828 A | 6/2014 |
| CN | 104101955 A | 10/2014 |
| CN | 104714279 A | 6/2015 |
| CN | 204666870 U | 9/2015 |
| CN | 105223653 A | 1/2016 |
| CN | 105278049 A | 1/2016 |
| CN | 205038371 U | 2/2016 |
| CN | 105372765 A | 3/2016 |
| CN | 105445863 A | 3/2016 |
| CN | 105637715 A | 6/2016 |
| CN | 106099506 A | 11/2016 |
| CN | 106154430 A | 11/2016 |
| CN | 205679807 U | 11/2016 |
| CN | 106532374 A | 3/2017 |
| CN | 106646782 A | 5/2017 |
| CN | 106654693 A | 5/2017 |
| CN | 206178199 U | 5/2017 |
| CN | 107843958 A | 3/2018 |
| CN | 108469654 A | 8/2018 |
| CN | 109073841 A | 12/2018 |
| CN | 110007405 A | 7/2019 |
| CN | 110187452 A | 8/2019 |
| CN | 209417354 U | 9/2019 |
| CN | 111106469 A | 5/2020 |
| EP | 0810455 A1 | 12/1997 |
| JP | H09213136 A | 8/1997 |
| JP | H1096834 A | 4/1998 |
| JP | 2003157926 A | 5/2003 |
| JP | 3107377 U | 2/2005 |
| JP | 2005121988 A | 5/2005 |
| JP | 2008180822 A | 8/2008 |
| JP | 2010039109 A | 2/2010 |
| JP | 2011146259 A | 7/2011 |
| JP | 2014013410 A | 1/2014 |
| JP | 2019149337 A | 9/2019 |

* cited by examiner

CONNECTOR ASSEMBLY AND OPTICAL-ELECTRICAL COMPOSITE CONNECTOR

CROSS-REFERENCE TO RELATED APPLICATIONS

This application is a continuation of International Application No. PCT/CN2020/113528, filed on Sep. 4, 2020, which claims priority to Chinese Patent Application No. 201911344083.5 filed on Dec. 20, 2019. The disclosures of the aforementioned applications are hereby incorporated by reference in their entireties.

TECHNICAL FIELD

This application relates to the field of optical-electrical connector technologies, and in particular, to a connector assembly and an optical-electrical composite connector.

BACKGROUND

With development of the 5th generation mobile networks (5G) and the next-generation fixed network, optical fiber-to-antenna, optical fiber-to-camera, optical fiber-to-traffic signal light, optical fiber-to-room, optical fiber-to-ceiling, and other optical fiber-to-access terminal demands are numerous. Optical fiber-to-access terminal builds foundation for high-speed instant communication in the intelligent era, meeting requirements for massive information and high-quality bandwidth in the intelligent era.

Both optical cables and electrical cables need to be laid during access to access terminals. Therefore, optical cables need to be laid again for the access terminals for which electrical cables have been laid. Therefore, an optical-electrical composite cable becomes a preferred solution for optical fiber-to-access terminals, that is, power-on and network connectivity are implemented through a single time of laying.

To connect these composite cables, an optical connector and an electrical connector that are separate from each other may be used. However, the optical connector and the electrical connector that are separate from each other need to be plugged and unplugged twice to complete optical and electrical connection and transmission. This is not only relatively complex in operation, but also requires two interfaces, increasing a volume of a device.

SUMMARY

Embodiments of this application provide a connector assembly and an optical-electrical composite connector, to resolve a technical problem that an optical connector and an electrical connector that are separate from each other need to be plugged and unplugged twice to complete optical and electrical connection and transmission. In the technical problem, operations are relatively complex, and two interfaces are required, increasing a volume of a device.

This application provides an optical-electrical composite connector, including a front housing, a rear housing, an optical fiber, a cable, and a conductive terminal. The front housing is axially provided with a through groove passing through the front housing. An inner wall of the through groove is provided with a first groove communicating with the through groove. The rear housing includes a main body portion and a clamping portion connected to one end of the main body portion. The clamping portion is axially provided with a first passage passing through the clamping portion. An outer surface of the clamping portion is axially provided with a second groove. The clamping portion is located in the through groove. The first groove is butted with the second groove to form an accommodation space. One end that is of the through groove and that is away from the main body portion is an optical port. The front housing is provided with an opening connecting to the accommodation space and the outside. The conductive terminal is accommodated in the opening. The conductive terminal forms an electrical port. The optical fiber passes through the main body portion and extends to the optical port along the first passage. The cable passes through the main body portion and is fixedly accommodated in the accommodation space. The cable is electrically connected to the conductive terminal.

In this application, an optical fiber and a cable are integrated into one optical-electrical composite connector, and optical transmission and electrical transmission can be implemented by using one connector, thereby resolving technical problems of a relatively large volume of a device and operation complexity caused by separately disposing an optical connector and an electrical connector to complete optical and electrical connection and transmission. In addition, the cable in this application passes through the main body portion and is accommodated in the accommodation space formed by butting the first groove with the second groove. An internal space of the main body portion is used, and a space between the front housing and the clamping portion is used, resulting in high utilization of an internal space of the optical-electrical composite connector. Therefore, there is no need to set a cable accommodation space on the optical-electrical composite connector for separately accommodating the cable, and there is no need to change an outline size of the optical-electrical composite connector, so that the optical-electrical composite connector has a small device volume. Both the optical port and the electrical port in this application are disposed on the front housing, that is, the optical port is formed on a front end face of the front housing, the electrical port is formed on a side face of the front housing, and the optical port and the electrical port are integrated into a same housing. A distance between the optical port and the electrical port may be designed relatively small. In this way, an axial length of the optical-electrical composite connector may be set to be relatively small, conducive to miniaturization development of the optical-electrical composite connector.

In a possible implementation, the clamping portion further includes a flange, the flange is disposed on a side that is of the second groove and that is away from the main body portion, and the cable is accommodated in the accommodation space and abuts against the flange. The cable abuts against the flange to limit an extension position of the cable, so that it can be determined that the extension position of the cable reaches the electrical port, facilitating conduction of the cable to the electrical port. The conductive terminal may be disposed at the electrical port, and the flange may be disposed to ensure that the conductive terminal is in close contact with the cable at the electrical port, thereby implementing conduction.

In a possible implementation, the main body portion includes a bottom wall, two first side walls axially disposed on a periphery of the bottom wall, and a second side wall connected between the two first side walls. The bottom wall, the two first side walls, and the second side wall enclose one receiving space.

The main body portion further includes a sleeve disposed in the receiving space. The first passage is butted to and communicates with the sleeve. A gap is formed between an outer surface of the sleeve and an inner surface of the first side wall. The receiving space includes the gap and a concave cavity communicating with the gap. The optical fiber passes through the first passage after sequentially passing through the concave cavity and the sleeve. The second side wall is provided with a through hole. The cable is fastened in the accommodation space after sequentially passing through the concave cavity, the gap, and the through hole. The concave cavity is configured to accommodate the cable and the optical fiber. The sleeve is disposed to separate the optical fiber from the cable to implement optical connection and electrical connection respectively. The optical fiber may pass through the sleeve and reach the optical port. The cable may pass along the gap through the through hole and reach the electrical port.

In a possible implementation, the bottom wall is provided with a support body, the support body is located in the gap, and the cable is supported on the support body. The support body is disposed, so that a central axis of the cable is higher than a central axis of the optical fiber, and the cable can pass through a higher position or a lower position of the gap without passing through a narrowest gap between an outer wall of the sleeve and the first side wall, thereby improving utilization of the receiving space. In addition, even if the cable is relatively thick, the cable can still pass through the gap, thereby enlarging an application scope of the cable.

In a possible implementation, the conductive terminal includes a conductor and two clamping arms connected to the conductor and disposed at a spacing. The conductive terminal is accommodated in the opening, so that the two clamping arms clamp the cable, and the cable is conducted to the electrical port by using the conductor. The clamping arms of the conductive terminal clamp the cable, so that a position of the cable at in the accommodation space can be fixed, thereby preventing the cable from shaking. In addition, the conductive terminal can be used as a carrier for conduction between the cable and the outside, and the conduction between the cable and the outside is implemented through connection between the conductor and the outside.

In a possible implementation, the optical-electrical composite connector further includes a ferrule assembly. The ferrule assembly includes a first ferrule column, a second ferrule column, a convex ring, and an elastic member. The convex ring is integrally formed at a front end of the second ferrule column, and the convex ring and the second ferrule column jointly form a ferrule tail handle. The convex ring is provided with a center hole. The first ferrule column is inserted into the center hole of the convex ring, to be fixedly connected to the ferrule tail handle. An inner surface of the front housing is provided with a protruding portion protruding into the through groove. An inner surface of the first passage is provided with a clamping position. The first ferrule column is connected to the second ferrule column. One end that is of the first ferrule column and that is away from the second ferrule column is the optical port. The elastic member surrounds the second ferrule column. When the clamping portion is mounted in the through groove, and the ferrule assembly is mounted in the first passage, the first ferrule column is accommodated in the first passage, and one end that is of the first ferrule column and that is away from the second ferrule column extends out of the front housing. The second ferrule column is accommodated in the first passage. The elastic member is elastically limited between the first ferrule column and the clamping position, and the elastic member pushes the first ferrule column to abut against the protruding portion. The optical fiber sequentially passes through the concave cavity, the sleeve, and the second ferrule cylinder, and extends into the first ferrule column. The ferrule assembly is configured to: when the optical fiber passes through the first passage, sleeve over the optical fiber to fasten and protect the optical fiber. That the elastic member is elastically limited between the first ferrule column and the clamping position, and pushes the first ferrule column to abut against the protruding portion can limit a position of the first ferrule column in the first passage, and determine a position at which the first ferrule column extends out of the first passage.

In a possible implementation, the optical-electrical composite connector further includes an elastic sheath. The elastic sheath is provided with a clamping hole. The main body portion is provided with a convex edge. The convex edge is clamped into the clamping hole, so that the rear housing is connected to the elastic sheath. The elastic sheath is provided with a second passage passing through the elastic sheath. The optical fiber sequentially passes through the second passage, the concave cavity, the sleeve, and the ferrule assembly. The cable sequentially passes through the second passage, the concave cavity, the gap, and the through hole, and then is fastened in the accommodation space. The elastic sheath can effectively reduce bending deformation of an optical-electrical composite cable when the optical-electrical composite cable is subject to a lateral load, thereby preventing optical performance of an internal optical fiber from being degraded due to an excessively small partial bending curvature of the optical-electrical composite cable.

In a possible implementation, the optical fiber and the cable form an optical-electrical composite cable. The optical-electrical composite cable further includes a coating layer and a cable sleeve. The coating layer is sleeved over the optical fiber. The cable sleeve is sleeved over the coating layer and the cable. When the clamping portion is clamped into the through groove and the ferrule assembly is formed in the first passage, the coating layer is exposed in the concave cavity, and the optical fiber is exposed in the first ferrule column. That the coating layer is exposed in the concave cavity means that in the concave cavity, the cable sleeve is not sleeved over the coating layer, so that there is a relatively large remaining space in the concave cavity, thereby facilitating mounting of a component in the concave cavity, for example, mounting of an optical fiber protection tube described below. That the optical fiber is exposed in the first ferrule column means that after the optical fiber passes through the second ferrule column, the coating layer no longer wraps the optical fiber, so that the optical fiber can be inserted into a hole of a relatively thin first ferrule column.

In a possible implementation, the optical-electrical composite connector further includes an optical fiber protection tube. The optical fiber protection tube is sleeved over the optical fiber. The optical fiber protection tube is accommodated in the receiving space. One end that is of the optical fiber protection tube and that is close to the elastic sheath is disposed between the cable sleeve and an inner surface of the receiving space. One end that is of the optical fiber protection tube and that is away from the elastic sheath is fastened to the inner surface of the receiving space. When the ferrule assembly is butted, the ferrule assembly has a slight backward rollback amount, and the optical fiber needs to move in a specific space. Protection of the optical fiber protection tube for the optical fiber can prevent the optical fiber from being excessively bent or even broken, thereby preventing optical performance from being affected.

In a possible implementation, the optical-electrical composite connector further includes a buckle. One end that is of the main body portion and that is away from the clamping portion is provided with a buckle hole. The buckle is clamped into the buckle hole to fasten the composite cable to the rear housing. After the rear housing is connected to the elastic sheath, the buckle is accommodated in the elastic sheath. Fastening the composite cable to the rear housing can ensure tensile strength of the optical-electrical composite cable. The buckle is accommodated in the elastic sheath, and the elastic sheath can further protect the optical-electrical composite cable and the buckle.

In a possible implementation, an outer surface of one end that is of the optical fiber protection tube and that is away from the elastic sheath is provided with a plurality of annular grooves, the plurality of annular grooves are arranged at a spacing, and glue is filled in the receiving space to form a colloid. To implement high-strength connection between the composite cable and the rear housing, glue needs to be filled between the optical fiber protection tube and the inner surface of the receiving space, to fasten the optical fiber protection tube. Provision of the annular groove can increase a distance between the optical fiber protection tube and the inner surface of the receiving space, so that the glue is prevented from dropping onto the optical fiber after flowing into the optical fiber protection tube along a tiny gap due to a capillary principle. In addition, the provision of the annular groove blocks a continuous path of a capillary phenomenon, thereby effectively preventing the glue from continuously penetrating into the optical fiber protection tube and dropping onto the optical fiber.

In a possible implementation, there is at least one cable. When there are a plurality of cables, power supply or duplex signal transmission can be implemented by using only one optical-electrical composite connector.

In a possible implementation, the front housing includes an inner housing and an outer housing. The outer housing is sleeved over the inner housing. The inner housing is axially provided with the first groove and the through groove that passes through the inner housing. Provision of the housing can protect the inner housing.

This application provides a connector assembly, including an adapter and the foregoing optical-electrical composite connector. The adapter includes an optical connector and an electrical connector. The adapter is provided with an inner cavity. The front housing is inserted into the inner cavity, so that the optical fiber is connected to the optical connector at the optical port, and the cable is connected to the electrical connector at the electrical port. Compared with an SC optical fiber connector, the optical-electrical composite connector in this application has no change in an interface size, and compared with an SC optical fiber adapter, the adapter does not need to have any change in an interface size.

In a possible implementation, the adapter is provided with the inner cavity and a mounting opening. A side wall of the inner cavity is provided with a cable hole passing through the side wall. One end of the electrical connector is accommodated in the inner cavity, and the other end of the electrical connector passes through the cable hole and extends out. A bottom wall that is of the inner cavity and that is opposite to the mounting opening is provided with a slot. The optical connector is disposed in the slot. The front housing is inserted into the inner cavity through the mounting hole, so that the optical fiber is inserted into the slot to connect to the optical connector, and the cable is conducted to the outside by using the electrical connector. The adapter in this implementation may be connected to a PCB by using an optical-electrical composite cable.

In a possible implementation, the adapter further includes a conductive sheet. The conductive sheet includes the electrical connector and a conductive connector. The inner cavity of the adapter is provided with a mounting opening. A side wall of the inner cavity is provided with a slot passing through the side wall. An outer surface of the side wall is provided with a mounting position. The electrical connector is clamped into the slot. The conductive connector is mounted at the mounting position. A bottom wall that is of the inner cavity and that is opposite to the mounting opening is provided with a slot. The optical connector is disposed in the slot. The front housing is inserted into the inner cavity, so that the optical fiber is inserted into the slot to connect to the optical connector, and the cable is connected to the electrical connector and is conducted to the outside by using the conductive connector. In this implementation, the conductive connector is mounted at the mounting position outside the inner cavity, so that an internal space of the inner cavity is larger.

In a possible implementation, there are two adapters, the two adapters are disposed back to back, and two slots are coaxially provided. The adapter in this implementation can implement connection between two optical-electrical composite cables and a PCB, and connection between optical fibers of two optical-electrical composite cables.

In conclusion, in this application, an optical fiber and a cable are integrated into one optical-electrical composite connector, and optical transmission and electrical transmission can be implemented by using one connector, thereby resolving technical problems of a relatively large volume of a device and operation complexity caused by separately disposing an optical connector and an electrical connector to complete optical and electrical connection and transmission. In addition, the cable in this application passes through the main body portion and is accommodated in the accommodation space formed by butting the first groove with the second groove. An internal space of the main body portion is used, and a space between the front housing and the clamping portion is used, resulting in high utilization of an internal space of the optical-electrical composite connector. Therefore, there is no need to set a cable accommodation space on the optical-electrical composite connector for separately accommodating the cable, and there is no need to change an outline size of the optical-electrical composite connector, so that the optical-electrical composite connector has a small device volume. Both the optical port and the electrical port in this application are disposed on the front housing, and a distance between the optical port and the electrical port is relatively small. In this way, an axial length of the optical-electrical composite connector may be set to be relatively small, so that the optical-electrical composite connector has a small volume.

BRIEF DESCRIPTION OF THE DRAWINGS

To describe the technical solutions in the embodiments of this application or in the background more clearly, the following briefly describes the accompanying drawings for describing the embodiments of this application or the background.

DETAILED DESCRIPTION OF ILLUSTRATIVE EMBODIMENTS

The following describes the embodiments of this application with reference to the accompanying drawings in the embodiments of this application.

Figure 1:
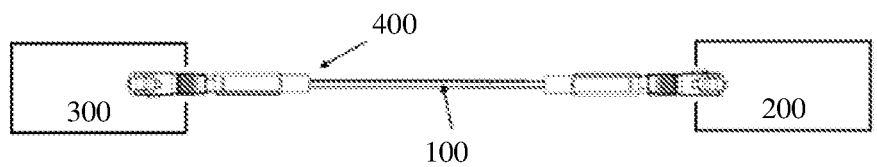
FIG. 1 is a schematic diagram of an optical communications system according to this application.

Referring to FIG. 1, this application provides an optical communications system. The optical communications system includes an optical-electrical transmit end device 200 and an optical-electrical receive end device 300. The optical-electrical transmit end device 200 is configured to output an electrical signal and an optical signal. The optical-electrical receive end device 300 is configured to receive an electrical signal and an optical signal. The optical-electrical transmit end device 200 and the optical-electrical receive end device 300 are connected by using an optical-electrical composite cable 100, to implement transmission of an optical signal and an electrical signal. However, the optical-electrical transmit end device 200 and the optical-electrical composite cable 100 need to be connected by using an optical-electrical composite connector 400. Specifically, an optical-electrical composite connector 400 that meets an SC interface standard is connected to one end of the optical-electrical composite cable 100. The corresponding optical-electrical transmit end device 200 is provided with at least one interface that meets SC optical-electrical composite integration, for plugging in the optical-electrical composite connector 400. The optical-electrical receive end device 300 and the optical-electrical composite cable 100 also need to be connected by using an optical-electrical composite connector 400. Specifically, an optical-electrical composite connector 400 that meets the SC interface standard is connected to the other end of the optical-electrical composite cable 100. The optical-electrical receive end device 300 is provided with one interface that meets the SC optical-electrical composite integration, for plugging in the optical-electrical composite connector 400. In this application, the optical-electrical transmit end device 200 may be a power module, and can output electric energy. The optical-electrical receive end device 300 may be a terminal device that requires electric energy, for example, a high-speed IP camera apparatus or a wireless AP.

The optical-electrical composite connector 400 is described in detail below.

The optical-electrical composite connector 400 includes a front housing, a rear housing, and an optical-electrical composite cable 100.

Figure 2:
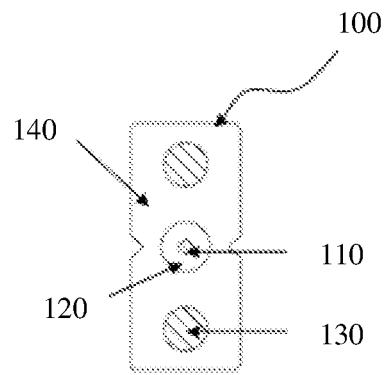
FIG. 2 is a schematic cross-sectional structural diagram of an optical-electrical composite cable according to this application.

FIG. 2 shows a schematic cross-sectional diagram of the optical-electrical composite cable 100. The optical-electrical composite cable 100 includes an optical fiber no, a cable 130, a coating layer 120, and a cable sleeve 140. The coating layer 120 is sleeved over the optical fiber no. The cable sleeve 140 is sleeved over the coating layer 120 and the cable 130. The coating layer 120 is mainly configured to protect the optical fiber 110, can enable the optical-electrical composite cable 100 to have sufficient tensile strength, and can protect the optical-electrical composite cable 100 from an improper stress. In this application, the coating layer 120 may be made of nylon, polybutylene terephthalate (PBT), or the like, and an outer diameter of the coating layer 120 ranges from 0.7 mm to 1.5 mm. Insulation materials can be used for the entire cable sleeve 140. Volume resistivity is greater than or equal to $1\times10^{12}$ Ω·m, dielectric strength is greater than or equal to 20 MV/m, and a temperature tolerance range is 70° C. to 200° C. Optionally, a cross section of the optical-electrical composite cable 100 is in a flat shape. The cable is made of conductive materials, such as a conductor or a conducting wire.

There is at least one cable 130. In a possible implementation shown in FIG. 2, there is one optical fiber no and two cables 130. The optical fiber no is located in a center, and the two cables 130 are located on two sides of the optical fiber no. It may be understood that, the optical-electrical composite cable 100 in this application may further include any quantity of optical fibers 110 and cables 130. There is at least one cable 130 in this application, so that when there are a plurality of cables 130, power supply or duplex signal transmission can be implemented by using only one optical-electrical composite connector 400. The following describes a case in which there is one optical fiber no and two cables 130 for the optical-electrical composite cable 100.

The following describes a front housing and a rear housing of the optical-electrical composite connector 400 and a connection relationship between the front housing and the rear housing.

Figure 3:
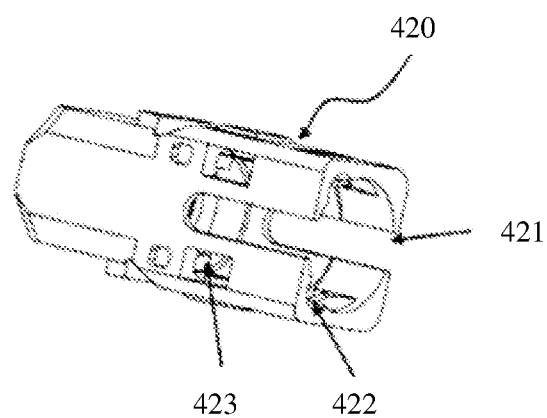
FIG. 3 is a schematic structural diagram of an inner housing according to this application.
Figure 4:
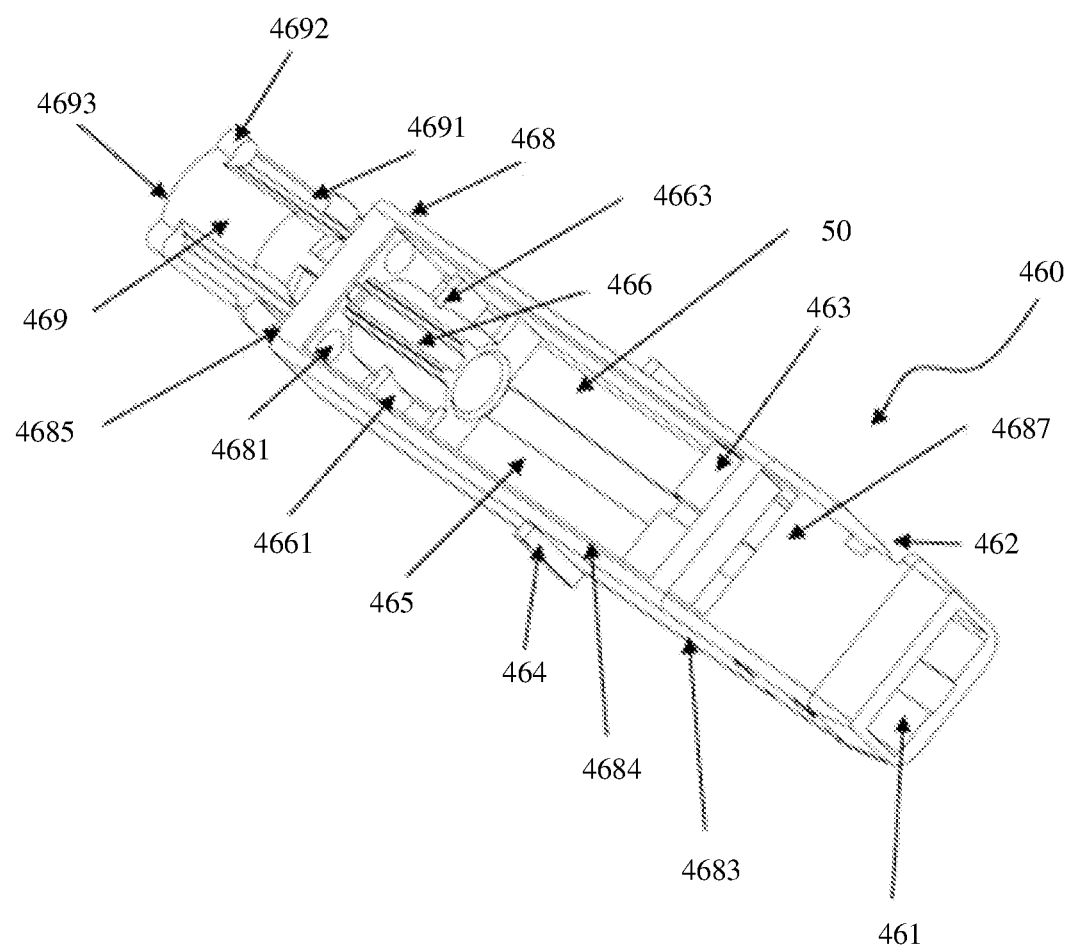
FIG. 4 is a schematic structural diagram of a rear housing according to this application.
Figure 5:
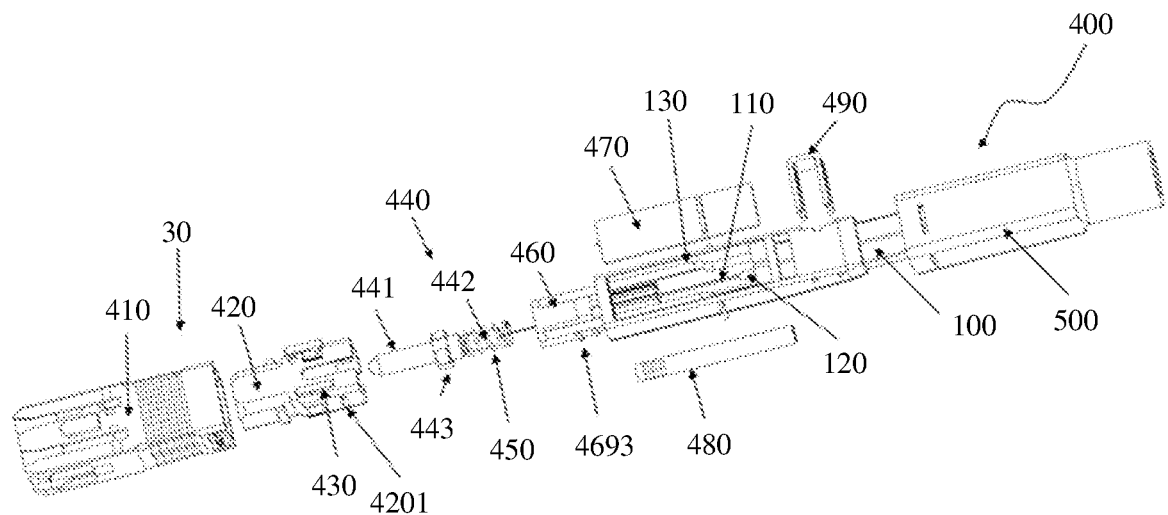
FIG. 5 is a schematic exploded structural diagram of an optical-electrical composite connector according to this application.

Refer to FIG. 3, FIG. 4, and FIG. 5. FIG. 5 is a schematic exploded structural diagram of the optical-electrical composite connector 400. The optical-electrical composite connector 400 shown in FIG. 5 includes a front housing 30 and a rear housing 460. The front housing 30 includes an outer housing 410 and an inner housing 420. FIG. 3 is a schematic structural diagram of the inner housing 420. FIG. 4 is a schematic structural diagram of the rear housing 460. For the front housing 30, the outer housing 410 is sleeved over the inner housing 420. The outer housing 410 is configured to protect the inner housing 420. The outer housing 410 is configured to perform functions such as guiding positioning, alignment, fastening, and unlocking when the outer housing 410 engages an adapter. The inner housing 420 is configured to assemble the rear housing 460, the optical fiber no, and the cable 130. The outer housing 410 and the inner housing 420 may alternatively be connected in sliding fit with each other, that is, after the outer housing 410 is sleeved over the inner housing 420, there may be a particular relative sliding amount between the outer housing 410 and the inner housing 420 along an axial direction, thereby facilitating unlocking after the adapter is inserted. Alternatively, the outer housing 410 and the inner housing 420 may be an integrated structure. It may be understood that the front housing 30 includes only the inner housing 420, and does not need the outer housing 410.

As shown in FIG. 3, the inner housing 420 is axially provided with a through groove 421 passing through the inner housing 420. For the optical-electrical composite connector 400, an axial direction may be understood as a cable extension direction. The inner housing 420 is of a hollow tubular structure, and a direction of extension between a front end face and a rear end face is the axial direction. An end, connected to the adapter, of the optical-electrical composite connector 400 is formed on the front end face. The rear end face is used to assemble the rear housing 460. An inner wall of the through groove 421 is provided with a first groove 422 communicating with the through groove 421. As shown in FIG. 3, a cross section of the through groove 421 is circular, a cross section of the first groove 422 is semicircular, and a periphery of the through groove 421 is provided with two first grooves 422. The inner housing 420 is provided with a guide hole 423, and the guide hole 423 enables the first groove 422 to communicate with the outside.

As shown in FIG. 4, the rear housing 460 includes a main body portion 468 and a clamping portion 469 connected to the main body portion 468. The clamping portion 469 is connected to a front end of the main body portion 468, and the optical-electrical composite cable extends into the main body portion 468 from a rear end of the main body portion 468, and extends to the clamping portion 469. The clamping portion 469 is axially provided with a first passage 4693 passing through the clamping portion 469. A position pointed to by a lead numbered 4693 in FIG. 4 is the first passage 4693. It may be understood that the first passage 4693 is a center through hole of the clamping portion 469. An outer surface of the clamping portion 469 is axially provided with a second groove 4691.

Figure 6:
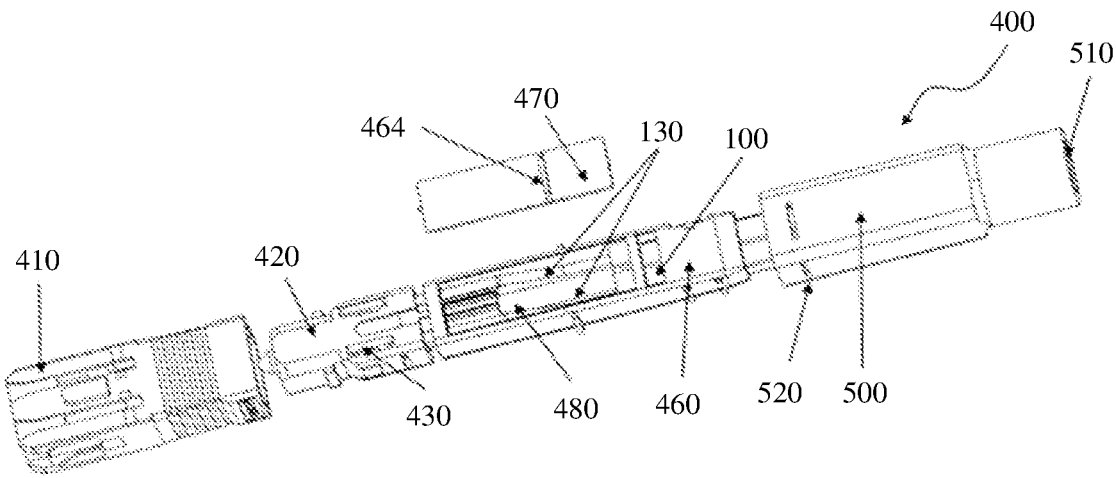
FIG. 6 is a schematic structural diagram of an optical-electrical composite connector according to this application.
Figure 7:
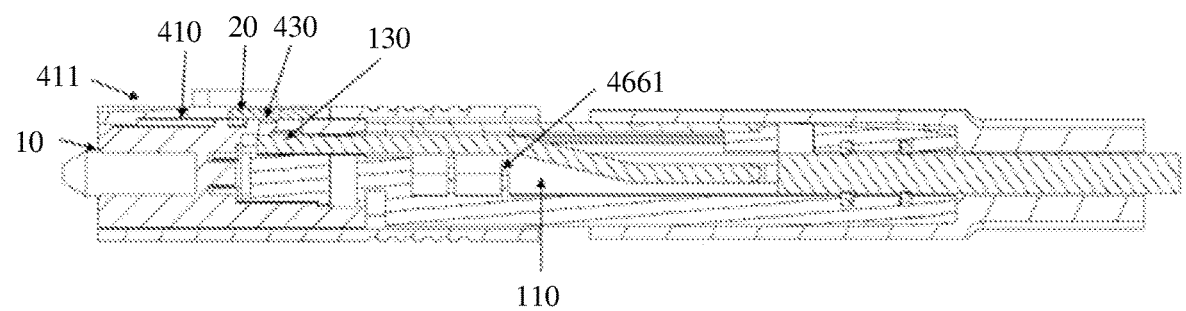
FIG. 7 is a first schematic cross-sectional structural diagram of an optical-electrical composite connector according to this application.

As shown in FIG. 6 and FIG. 7, when the rear housing 460 is assembled to the front housing 30, the clamping portion 469 is clamped into the through groove 421. In a possible implementation, the outer surface of the clamping portion 469 is in close contact with the inner wall of the through groove 421. In this manner, the clamping portion 469 is fixedly connected to the through groove 421. Alternatively, the clamping portion 469 may be fastened in the inner housing 420 by using another fixed structure. The first groove 422 is butted with the second groove 4691 to form an accommodation space. One end that is of the through groove 421 and that is away from the main body portion 468 is an optical port 10 (as shown in FIG. 7). The front housing 30 is provided with an opening that connects the accommodation space and the outside, that is, a position of the guide hole 423 disposed on the inner housing 420. The electrical port 20 is formed at the opening (as shown in FIG. 7). The optical fiber no passes through the main body portion 468 and extends to the optical port 10 along the first passage 4693. The cable 130 passes through the main body portion 468 and is fixedly accommodated in the accommodation space. A position of the electrical port 20 is used to dispose the conductive terminal 430. The cable 130 is electrically connected to the conductive terminal 430. It may be understood that the outside described in this application is a space outside an outer surface of the optical-electrical composite connector 400.

In this application, an optical fiber no and a cable 130 are integrated into one optical-electrical composite connector 400, and optical transmission and electrical transmission can be implemented by using one connector, thereby resolving technical problems of a relatively large volume of a device and operation complexity caused by separately disposing an optical connector and an electrical connector to complete optical and electrical connection and transmission. In addition, the cable 130 in this application passes through the main body portion 468 and is accommodated in the accommodation space formed by butting the first groove 422 with the second groove 4691. An internal space of the main body portion 468 is used, and a space between the front housing 30 and the clamping portion 469 is used, resulting in high utilization of an internal space of the optical-electrical composite connector 400. Therefore, there is no need to set a cable accommodation space on the optical-electrical composite connector for separately accommodating the cable 130, and there is no need to change an outline size of the optical-electrical composite connector 400, so that the optical-electrical composite connector 400 has a small device volume. Both the optical port 10 and the electrical port 20 in this application are disposed on the front housing 30, that is, the optical port is formed on a front end face of the front housing, the electrical port is formed on a side face of the front housing, and the optical port and the electrical port are integrated into a same housing. A distance between the optical port and the electrical port may be designed relatively small. In this way, an axial length of the optical-electrical composite connector 400 may be set to be relatively small, conducive to miniaturization development of the optical-electrical composite connector 400.

In a possible implementation, the front housing 30 includes an inner housing 420 and an outer housing 410. The outer housing 410 is sleeved over the inner housing 420. The outer housing 410 partially extends to an outer surface of the main body portion 468 of the rear housing 460. The outer housing 410 wraps both the inner housing 420 and a part of the rear housing 460, so that a joint of the inner housing 420 and the rear housing 460 is hidden inside the outer housing 410, forming an overall architecture. The outer housing 410 is configured to be inserted into the following adapter.

Referring to FIG. 5, in a specific implementation, the outer surface of the clamping portion 469 is provided with a boss 4693. The boss 4693 is disposed on one side of the second groove 4691. An inner surface of the inner housing 420 is provided with a groove opening 4201. The groove opening 4201 may pass through a side wall of the inner housing 420, or may not pass through the side wall of the inner housing 420. The groove opening 4201 is disposed on one side of the first groove 422. The boss 4693 is clamped into the groove opening 4201, so that the clamping portion 469 is clamped into the through groove 421, and the clamping portion 469 can be fastened in the inner housing 420.

In a possible implementation, a cross section of the first groove 422 is semi-circular, and a cross section of the second groove 4691 is semi-circular. When the first groove 422 is butted with the second groove 4691 to form an accommodation space, a cross section of the accommodation space is circular. When the cross section of the optical-electrical composite cable is in a flat shape, the cross section of the cable 130 is circular (or the cable 130 may be in the flat shape), and the cable 130 adapts to a shape of the accommodation space, so that the cable 130 can be better accommodated in the accommodation space.

Still referring to FIG. 4 and FIG. 5, in a specific implementation, the clamping portion 469 further includes a flange 4692. The flange 4692 is disposed on one side that is of the second groove 4691 and that is away from the main body portion 468. The cable 130 is accommodated in the accommodation space and abuts against the flange 4692. The cable 130 abuts against the flange 4692 to limit an extension position of the cable 130, so that it can be determined that the extension position of the cable 130 reaches the electrical port 20, facilitating conduction of the cable 130 to the electrical port 20. In addition, it can be ensured that after the following conductive terminal 430 is clamped into an opening of the front housing 30 from the electrical port 20, the conductive terminal 430 can be in close contact with the cable 130, to implement conduction. In this application, the flange 4692 and the second groove 4691 may be formed together. To be specific, when the second groove 4691 is formed, the second groove 4691 only passes through one end that is of the clamping portion 469 and that is close to the main body portion 468, but does not pass through one end that is of the clamping portion 469 and that is away from the main body portion 468. Therefore, in an extension direction of the second groove 4691, a part that is of the clamping portion 469 and that blocks the second groove 4691 is the flange 4692. The flange 4692 is naturally formed in a forming process of the second groove 4691. In another implementation, the second groove 4691 may axially pass through the clamping portion 469, and the flange 4692 may be separately disposed on one side that is of the clamping portion 469 and that is away from the main body portion 468.

In a possible implementation, the main body portion 468 includes a bottom wall 4683, two first side walls 4684 axially disposed on a periphery of the bottom wall 4683, and a second side wall 4685 connected between the two first side walls 4684. The bottom wall 4683, the two first side walls 4684, and the second side wall 4685 enclose one receiving space 50.

The main body portion 468 further includes a top wall 4687 and a cover plate 470. The top wall 4687 covers one end that is of the first side wall 4684 and that is away from the clamping portion 469. The bottom wall 4683, the top wall 4687, and the first side wall 4684 form an opening 461 of the receiving space 50. The opening 461 is away from the clamping portion 469. The optical-electrical composite cable 100 extends into the receiving space 50 through the opening 461. After the top wall 4687 partially covers the first side wall 4684, the receiving space 50 is partially exposed, and the exposed receiving space 50 facilitates mounting or adjusting the following components, for example, adjusting a position of the cable 130 and mounting an optical fiber protection tube 480. The cover plate 470 is configured to cover the exposed receiving space 50 after a component in the receiving space 50 is mounted and a position of the component is adjusted.

In a possible implementation, the main body portion 468 further includes a sleeve 466 disposed in the receiving space 50. The first passage 4693 is butted with the sleeve 466. An internal space of the sleeve 466 communicates with the first passage 4693. A gap 4661 is formed between an outer surface of the sleeve 466 and an inner surface of the first side wall 4684. The receiving space 50 includes the gap 4661 and a concave cavity 465 communicating with the gap 4661. After sequentially passing through the concave cavity 465 and the internal space of the sleeve 466, the optical fiber no extends into the first passage 4693. The second side wall 4685 is provided with a through hole 4681. The through hole 4681 enables the receiving space 50 to communicate with the second groove 4691. The cable 130 sequentially passes through the concave cavity 465, the gap 4661, and the through hole 4681, and then extends into and is fastened in the accommodation space (formed by butting the first groove 422 with the second groove 4691). In this application, the sleeve 466 is close to the clamping portion 469. The concave cavity 465 is located in an axial direction of the sleeve 466. The gap 4661 is located in a radial direction of the sleeve 466 and is located on each of two sides of the sleeve 466. The receiving space 50 may be divided into four areas. A space in the sleeve 466 is one area, two gaps 4661 on two radial sides of the sleeve 466 are two areas, and the concave cavity 465 in the axial direction of the sleeve 466 is one area. The space in the sleeve 466 communicates with the concave cavity 465, and the gap 4661 communicates with the concave cavity 465, so that the cable 130 can pass through the concave cavity 465 and then pass through the gap 4661, and the optical fiber no passes through the concave cavity 465 and then passes through the sleeve 466. Therefore, the receiving space 50 is divided into the space in the sleeve 466, the gaps 4661, and the concave cavity 465 by disposing the sleeve 466. Further, the sleeve 466 also separates the optical fiber no from the cable 130 to implement optical transmission and electrical transmission respectively. The optical fiber no may pass through the sleeve 466 and reach the optical port 10 for electrical connection. The cable 130 may pass through the through hole 4681 along the gap 4661 and reach the electrical port 20 for electrical connection.

In a possible implementation, the bottom wall 4683 is provided with a support body 4663, the support body 4663 is located in the gap 4661, and the cable 130 is supported on the support body 4663. There may be one or more support bodies 4663. When there are a plurality of support bodies 4663, the plurality of support bodies 4663 are arranged at a spacing in the gap 4661. The support body 4663 can be mounted in the gap 4661 on both sides of the sleeve 466. The support body 4663 in this application is disposed, so that a central axis of the cable 130 is higher than a central axis of the optical fiber no, and the cable 130 can pass through a higher position or a lower position of the gap 4661 without passing through a narrowest gap between an outer wall of the sleeve 466 and the first side wall 4684, thereby improving utilization of the receiving space 50. In addition, even if the cable 130 is relatively thick, the cable 130 can still pass through the gap 4661, thereby enlarging an application scope of the cable 130. It may be understood that the sleeve 466 is located at a central position of the main body portion 468 (a center of the sleeve 466 coincides with a central axis of the main body portion 468, or a center that is of the sleeve 466 and that is close to a central axis of the main body portion 468). In this way, there is a relatively large idle space in each of four corners of the main body portion 468. In this application, an idle space outside the sleeve 466 is used for layout of the cable 130. In this architecture, the cable 130 needs to be disposed in an additional space on each of the rear housing and the front housing, so that a smaller-sized optical-electrical composite connector 400 can be obtained.

Figure 8:
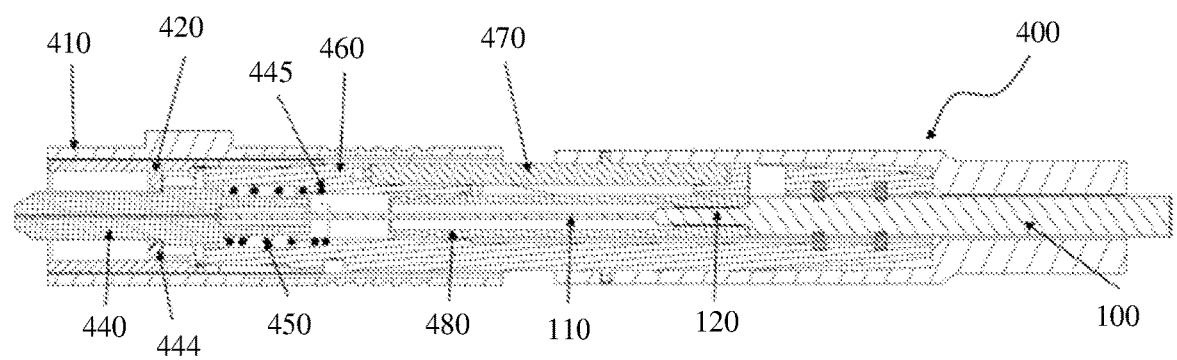
FIG. 8 is a second schematic cross-sectional structural diagram of an optical-electrical composite connector according to this application.

Still referring to FIG. 5, in a possible implementation, the optical-electrical composite connector 400 further includes a ferrule assembly 440. The ferrule assembly 440 includes a first ferrule column 441, a second ferrule column 442, a convex ring 443, and an elastic member 450. The second ferrule column 442 and the convex ring 443 may be an integral structure. The convex ring 443 is located at a front end of the second ferrule column 442. The second ferrule column 442 and the convex ring 443 jointly form a ferrule tail handle. The convex ring 443 is located at a front end of the ferrule tail handle. The convex ring 443 is provided with a center hole. The first ferrule column 441 is inserted into the center hole of the convex ring 443 and is fastened to the convex ring 443, and may be fastened by pressing riveting. It may also be understood that the convex ring 443 is sleeved over the first ferrule column 441. Referring to FIG. 8, the inner surface of the inner housing 420 is provided with a protruding portion 444 protruding into the through groove 421. An inner surface of the first passage 4693 is provided with a clamping position 445. The first ferrule column 441 is fixedly connected to the ferrule tail handle through fixed connection between the first ferrule column 441 and the convex ring 443, that is, the first ferrule column 441 is fixedly connected to the second ferrule column 442. The elastic member 450 is sleeved over the second ferrule column 442. When the clamping portion 469 is mounted in the through groove 421, and the ferrule assembly 440 is mounted in the first passage 4693, the first ferrule column 441 is accommodated in the first passage 4693, and one end that is of the first ferrule column 441 and that is away from the second ferrule column 442 extends out of the front housing 30. The second ferrule column 442 is accommodated in the first passage 4693. The elastic member 450 is elastically limited between the first ferrule column 441 and the clamping position 445, and the elastic member 450 pushes the first ferrule column 441 to abut against the protruding portion 444. The optical fiber no sequentially passes through the concave cavity 465, the sleeve 466, and the second ferrule column 442, and extends into the first ferrule column 441. In this application, the elastic member 450 may alternatively be a spring. The end that is of the first ferrule column 441 and that is away from the second ferrule column 442 is the optical port 20.

In this application, a diameter of the second ferrule column 442 is less than a diameter of the first ferrule column 441, so that when the clamping portion 469 is mounted in the through groove 421 and the ferrule assembly 440 is mounted in the first passage 4693, the elastic member 450 is elastically limited between the clamping position 445 and one end face of the first ferrule column 441 facing the second ferrule column 442. In another implementation, the elastic member 450 may alternatively be elastically limited between the convex ring 443 and the clamping position 445. Optionally, the end that is of the first ferrule column 441 and that protrudes out of the front housing 30 is in a shape of a round table.

Therefore, when the optical fiber no passes through the first passage 4693, the ferrule assembly 440 in this application is sleeved over the optical fiber 110, to fasten and protect the optical fiber 110. That the elastic member 450 is elastically limited between the first ferrule column 441 and the clamping position 445, and pushes the first ferrule column 441 to abut against the protruding portion 444 can limit a position of the first ferrule column 441 in the first passage 4693, and determine a position at which the first ferrule column 441 extends out of the first passage 4693.

Referring to FIG. 5 to FIG. 7, in a possible implementation, the optical-electrical composite connector 400 further includes an elastic sheath 500. The elastic sheath 500 is provided with a clamping hole 520. The main body portion 468 is provided with a convex edge 464. The convex edge 464 is clamped into the clamping hole 520, so that the rear housing 460 is connected to the elastic sheath 500. The elastic sheath 500 is provided with a second passage 510 passing through the elastic sheath 500. The optical fiber no sequentially passes through the second passage 510, the concave cavity 465, the sleeve 466, and the ferrule assembly 440. The cable 130 sequentially passes through the second passage 510, the concave cavity 465, the gap 4661, and the through hole 4681, and then is fastened in the accommodation space. Specifically, the convex edge 464 is disposed around the first side wall 4684 and the cover plate 470. The convex edge 464 is approximately disposed in a middle part of the main body portion 468. The convex edge 464 is clamped into the clamping hole 520, so that the elastic sheath 500 is approximately sleeved in the middle part of the main body portion 468. Optionally, there are four convex edges 464, and the four convex edges 464 are separately disposed on the cover plate 470, the two first side walls 4684, and the bottom wall 4683. There are four clamping holes 520, and the four clamping holes 520 are separately disposed on four side walls of the elastic sheath 500. In this application, not only the optical fiber no and the cable 130 pass through the second passage 510, but also both the coating layer 120 and the cable sleeve 140 pass through the second passage 510. In other words, the entire optical-electrical composite cable 100 passes through the second passage 510. In this way, the elastic sheath 500 can effectively reduce bending deformation of the optical-electrical composite cable 100 when the optical-electrical composite cable 100 is subject to a lateral load, thereby preventing optical performance of the internal optical fiber no from being degraded due to an excessively small partial bending curvature of the optical-electrical composite cable 100.

Referring to FIG. 8, when the clamping portion 469 is clamped into the through groove 421 and the ferrule assembly 440 is mounted in the first passage 4693, the coating layer 120 is exposed in the concave cavity 465, and the optical fiber no is exposed in the first ferrule column 441. That the coating layer 120 is exposed in the concave cavity 465 means that when the optical-electrical composite cable 100 passes through the second passage 510 and enters the concave cavity 465, the cable sleeve 140 is not sleeved over the coating layer 120, and the cable sleeve 140 is detached from the coating layer 120, making it easy to separate the cable 130 from the optical fiber 110, so that there is a relatively large remaining space in the concave cavity 465, facilitating accommodation of a component in the concave cavity 465, for example, disposition of an optical fiber protection tube 480 described below. That the optical fiber no is exposed in the first ferrule column 441 means that after the optical fiber no passes through the second ferrule column 442, the coating layer 120 no longer wraps the optical fiber 110, so that the optical fiber no can be inserted into a hole of a relatively thin first ferrule column 441.

In a possible implementation, the optical-electrical composite connector 400 further includes an optical fiber protection tube 480. The optical fiber protection tube 480 is sleeved over the optical fiber 110. The optical fiber protection tube 480 is accommodated in the receiving space 50. One end that is of the optical fiber protection tube 480 and that is close to the elastic sheath 500 is disposed between the cable sleeve 140 and an inner surface of the receiving space 50. One end that is of the optical fiber protection tube 480 and that is away from the elastic sheath 500 is fastened to the inner surface of the receiving space 50. Specifically, the optical fiber protection tube 480 is sleeved over the coating layer 120. When the ferrule assembly 440 is butted, the ferrule assembly 440 has a slight backward rollback amount, and the optical fiber no needs to move in a specific space. Otherwise, the optical fiber no is excessively bent or even the optical fiber no is broken, affecting optical performance. The optical fiber protection tube 480 is sleeved over the optical fiber no to protect the optical fiber 110, so that the optical fiber no can be prevented from being excessively bent or even broken, thereby preventing optical performance from being affected.

Specifically, to implement high-strength connection between the optical-electrical composite cable 100 and the rear housing 460, glue needs to be filled between the optical fiber protection tube 480 and the inner surface of the receiving space 50, to fasten the optical fiber protection tube 480. Preferably, the glue is DG-3S or EP500 with high bonding strength and good insulation performance. The gap 4661 between the optical fiber protection tube 480 and the inner surface of the receiving space 50 needs to be strictly controlled because a horizontal glue filling manner is used. When the gap 4661 is excessively large, the glue flows into a cavity of the optical fiber protection tube 480 along the gap 4661, and drops onto the optical fiber 110. When the gap 4661 is excessively small, an assembly problem is caused. In addition, the glue drops onto the optical fiber no after flowing into the cavity of the optical fiber protection tube 480 along the tiny gap 4661 due to a capillary principle. A gap 4661 between an outer diameter of the optical fiber protection tube 480 and the inner surface of the receiving space 50 is controlled to fall within 0.1 mm and 0.4 mm, and a preferred process parameter is 0.15 mm.

Figure 9:
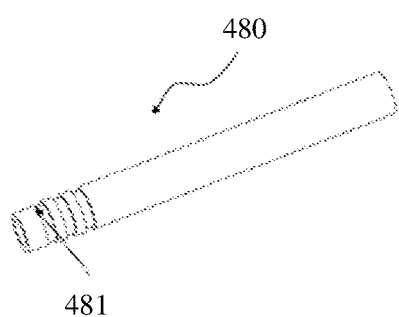
FIG. 9 is a schematic structural diagram of an optical fiber protection tube according to this application.

Referring to FIG. 9, in a possible implementation, an outer surface of one end that is of the optical fiber protection tube 480 and that is away from the elastic sheath 500 is provided with a plurality of annular grooves 481, and the plurality of annular grooves 481 are arranged at a spacing. To further avoid glue penetration caused by a capillary phenomenon, the annular groove 481 disposed on the outer surface of the end that is of the optical fiber protection tube 480 and that is away from the elastic sheath 500 can increase a distance between the optical fiber protection tube 480 and the inner surface of the receiving space 50, so that the glue is prevented from dropping onto the optical fiber no after flowing into the optical fiber protection tube 480 along the tiny gap 4661 due to the capillary principle. In addition, the provision of the annular groove 481 blocks a continuous path of the capillary phenomenon, thereby effectively preventing the glue from continuously penetrating into the optical fiber protection tube 480 and dropping onto the optical fiber 110.

Still referring to FIG. 5, in a possible implementation, the optical-electrical composite connector 400 further includes a buckle 490. One end that is of the main body portion 468 and that is away from the clamping portion 469 is provided with a buckle hole. The buckle 490 is clamped into the buckle hole to fasten the optical-electrical composite cable 100 to the rear housing 460. After the rear housing 460 is connected to the elastic sheath 500, the buckle 490 is accommodated in the elastic sheath 500. Specifically, the buckle hole disposed on each of the two first side walls 4684, and a disposing position of the buckle hole is close to the top wall 4687. The buckle 490 is clamped into the buckle hole, so that the optical-electrical composite cable 100 can be fastened to the rear housing 460. A material of the buckle 490 is optionally metal. Fastening the composite cable to the rear housing 460 can ensure tensile strength of the composite cable. In this application, after the buckle 490 is clamped into the buckle hole, the elastic sheath 500 is sleeved over the rear housing 460, so that the buckle 490 can be accommodated in the elastic sheath 500, and the elastic sheath 500 can protect the composite cable and the buckle 490.

Figure 10:
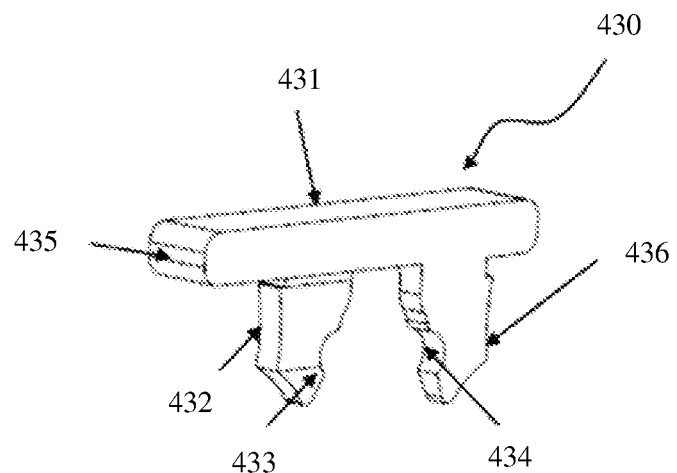
FIG. 10 is a schematic structural diagram of a conductive terminal according to this application.

Referring to FIG. 10, in a possible implementation, the optical-electrical composite connector 400 further includes a conductive terminal 430. The conductive terminal 430 includes a conductor 435 and two clamping arms 436 connected to the conductor 435 and disposed at a spacing. The conductive terminal 430 is accommodated in the opening, so that the two clamping arms 436 clamp the cable 130, and the cable 130 is conducted to the electrical port 20 by using the conductor 435. Specifically, the inner housing 420 is provided with a guide hole 423, and the outer housing 410 is provided with an accommodation hole. After the outer housing 410 is sleeved over the inner housing 420, the accommodation hole communicates with the guide hole 423. The clamping arms 436 protrude into the accommodation space through the guide hole to clamp the cable 130. The conductor 435 is accommodated in the accommodation hole. An outer surface 431 of the conductor 435 is not higher than an outer surface of the outer housing 410.

One end that is of each clamping arm 436 and that is away from the conductor 435 is provided with a blade 433. The two blades 433 are staggered from each other. The blade 433 drives the clamping arm 436 to protrude into the accommodation space through the guide hole. An inner surface of each clamping arm 436 is provided with a concave portion 434. The two concave portions 434 are configured to accommodate the cable 130. When the two clamping arms 436 clamp the cable 130, the two blades 433 are stretched out so that the cable 130 can pass through the blades 433 to the concave portion 434, and further, the two clamping arms 436 clamp the cable 130 in the two concave portions 434 to implement close contact with the cable 130. When the clamping arm 436 passes through the guide hole, the clamping arm 436 and the guide hole forcibly interfere with each other in extrusion assembly, to improve a friction force between the conductive terminal 430 and the inner housing 420. An outer surface 432 of each clamping arm 436 is designed to be in a shape of a hyperbola, that is, a middle area is depressed, and areas on two sides are extruded, so that the clamping arm 436 can easily pass through the guide hole. A material of the conductive terminal 430 may be a material of common conductors such as copper, a copper alloy, aluminum, or an aluminum alloy. The conductive terminal 430 may be subject to surface treatment, for example, surface plating with hard gold, to ensure excellent corrosion resistance performance and good electrical conductivity. There are also a plurality of conductive terminals 430, and the conductive terminals 430 are in a one-to-one correspondence with the cables 130. In this application, the clamping arms 436 of the conductive terminal 430 clamp the cable 130, so that a position of the cable 130 in the accommodation space can be fixed, thereby preventing the cable 130 from shaking. In addition, the conductive terminal 430 can be used as a carrier for conduction between the cable 130 and the outside, and the conduction between the cable 130 and the outside is implemented through connection between the conductor 435 and the outside. Therefore, the flange 4692 in the foregoing description may alternatively correspond to the conductive terminal 430 at a position for limiting the cable 130, to ensure that the conductive terminal 430 can be in close contact with the cable 130 after the conductive terminal 430 is clamped into the opening of the front housing 30 from the electrical port 20, thereby implementing conduction.

Therefore, the optical-electrical composite connector 400 in this application uses the internal space of the main body portion 468, and uses the space between the front housing 30 and the clamping portion 469, resulting in high utilization of the internal space of the optical-electrical composite connector 400. Therefore, there is no need to set a cable accommodation space on the optical-electrical composite connector 400 for separately accommodating the cable 130, and there is no need to change an interface size of the optical-electrical composite connector 400, so that the optical-electrical composite connector 400 has a small device volume. In addition, compared with an SC optical fiber connector, the optical-electrical composite connector 400 in this application has no change in an interface size. However, the optical-electrical composite connector 400 in this application can implement both optical transmission and electrical transmission.

This application further provides a connector assembly, including an adapter and the foregoing optical-electrical composite connector 400. The adapter includes an optical connector and an electrical connector. The adapter is provided with an inner cavity. The front housing 30 is inserted into the inner cavity, so that the optical fiber no is connected to the optical connector at the optical port 10, and the cable 130 is connected to the electrical connector at the electrical port 20. Based on the foregoing description, the interface size of the optical-electrical composite connector 400 in this application does not change. To be specific, compared with the SC optical fiber connector, the optical-electrical composite connector 400 in this application can maintain the interface size unchanged, and can transmit both an electrical signal and an optical signal. When the interface size of the optical-electrical composite connector 400 in this application does not change, an interface size of the adapter in this application does not need to change. The following describes the adapter. The adapter includes at least the following four embodiments. The adapter in this application is applicable to onboard adaptation.

Embodiment 1

Figure 11:
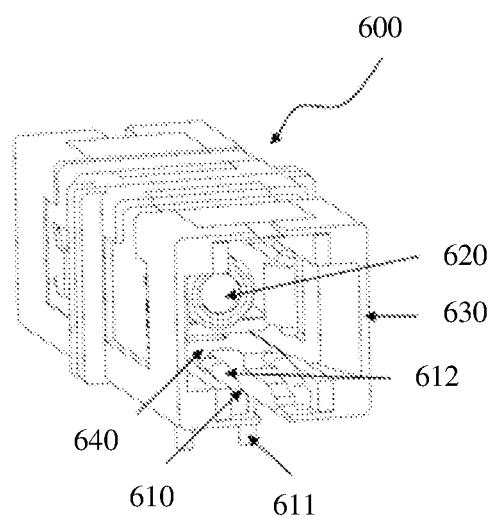
FIG. 11 is a schematic structural diagram of a first type of adapter according to this application.

Referring to FIG. 11, an adapter 600 is provided with an inner cavity 640 and a mounting opening 630. A side wall of the inner cavity 640 is provided with a cable hole 650 passing through the side wall. An electrical connector 610 that passes through the cable hole 650 is disposed in the cable hole 650. A bottom wall that is of the inner cavity 640 and that is opposite to the mounting opening 630 is provided with a slot 620. An optical connector is disposed in the slot 620. The front housing 30 is inserted into the inner cavity 640, so that the optical fiber no is inserted into the slot 620 to connect to the optical connector, and the cable 130 is conducted to the outside by using the electrical connector 610.

Specifically, a shape of the inner cavity 640 of the adapter 600 is consistent with an interface size of a standard SC connector. There is one pair of electrical connectors 610. The pair of electrical connectors are molded on the side wall of the inner cavity 640. The electrical connectors 610 are bent downwards and protrude to the outside through the cable hole. When the electrical connector 610 needs to be connected to and conducted with a PCB, the electrical connector 611 protruding out of the PCB may be inserted into a copper hole of the PCB to connect to a component on the PCB. When the front housing 30 is inserted into the inner cavity 640, a surface 612 of the electrical connector 610 exposed in the inner cavity is in contact with a surface 431 that is of the conductive terminal 430 and that is away from the clamping arm 436, and the electrical connector 610 is connected to and conducted with the cable 130. Therefore, when the cable 130 is connected to and conducted with the electrical connector 610, and the electrical connector 610 is connected to and conducted with the PCB, the cable 130 of the optical-electrical composite cable 100 is connected to the component on the PCB. The adapter 600 can implement connection between an optical-electrical composite cable 100 and a PCB.

In a specific implementation, the electrical connector 610 is an elastic metal wire. The elastic metal wire is molded on the side wall of the inner cavity 640 and passes through the side wall of the inner cavity 640. The elastic metal wire is bent downwards to be inserted into the copper hole of the PCB. Reliable electrical connection is implemented between the elastic metal wire and the PCB through welding. The elastic metal wire uses a metal with good elasticity and toughness, such as a copper alloy or an aluminum alloy. A preferred option is C5210 phosphor bronze. To improve conductivity performance of the copper alloy, a metal surface may be gold-plated.

A cavity of the slot 620 is configured to accommodate the end, in the shape of the round table, of the first ferrule column 441 at the front end of the ferrule assembly 440. Under action of the elastic member 450, it can be ensured that the slot 620 is closely butted with the end, in the shape of the round table, of the first ferrule column 441. In this way, the optical fiber no passing through the optical-electrical composite cable 100 is butted.

Embodiment 2

Figure 12:
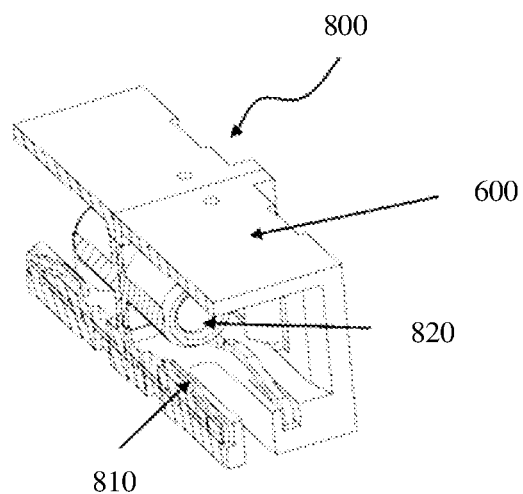
FIG. 12 is a schematic structural diagram of a second type of adapter according to this application.

Referring to FIG. 12, a difference between an adapter in the second specific implementation and the adapter in the first specific implementation lies in that: there are two adapters 600, and the two adapters 600 are connected back to back to form a new adapter 800, so that the two slots 820 are coaxially disposed. There are two pairs of electrical connectors 810 of the adapter 800. Each pair of electrical connectors 810 may be connected to an optical-electrical composite cable 100 of one optical-electrical composite connector 100. Therefore, the adapter 800 may be plugged into two optical-electrical composite connectors 400 at the same time, that is, match two optical-electrical composite cables 100 at the same time. In one case, the two adapters 600 are electrically connected to the PCB, so that an electrical signal of the optical-electrical composite cable 100 is transmitted by using a cable on the PCB, or an optical transport unit may be fastened on the PCB, so that an optical signal of the optical-electrical composite connector 400 is transmitted to the optical transport unit on the PCB. In another case, after the two slots 820 are coaxially disposed, the two slots 820 can directly communicate with each other. An optical-electrical composite connector 400 is inserted into each slot 820, so that optical fibers 110 of the two optical-electrical composite connectors 400 are aligned to transmit an optical signal, that is, an optical signal is transmitted from one optical-electrical composite connector 400 to the other optical-electrical composite connector 400. Similarly, the electrical connectors 810 of the two adapters 600 are also directly connected. In this way, an electrical signal of one of the optical-electrical composite connectors 400 is transmitted to the cable 130 of the other optical-electrical composite connector 400 by using the electrical connector 810.

Embodiment 3

Figure 13:
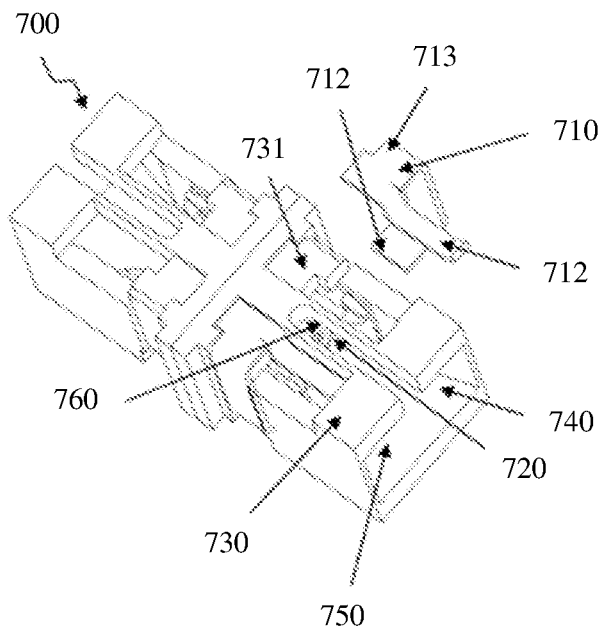
FIG. 13 is a schematic structural diagram of a third type of adapter according to this application.

Referring to FIG. 13, an adapter 700 includes a conductive sheet 710. The conductive sheet 710 includes an electrical connector 712 and a conductive connector 713. An inner cavity 740 of the adapter is provided with a mounting opening 750. A side wall of the inner cavity 740 is provided with a slot 720 passing through a side wall. An outer surface of the side wall is provided with a mounting position 731. The electrical connector 712 is clamped into the slot 720. The conductive connector 713 is mounted at the mounting position 731. A bottom wall that is of the inner cavity 740 and that is opposite to the mounting opening 750 is provided with a slot 760. An optical connector is disposed in the slot 760. The front housing 30 is inserted into the inner cavity 740, so that the optical fiber no is inserted into the slot 760 to connect to the optical connector, and the cable 130 is connected to the electrical connector 712 and is conducted to the outside by using the conductive connector 713.

Specifically, a shape of the inner cavity 740 of the adapter is consistent with an interface size of a standard SC connector. There is one electrical connector 712, and the electrical connector 712 is clamped into the slot 720. When the electrical connector 712 needs to be connected to and conducted with a PCB, the conductive connector 713 may be connected to a component on the PCB. When the front housing 30 is inserted into the inner cavity 740, a surface of the electrical connector 712 exposed in the inner cavity 740 is in contact with a surface of the conductive terminal 430 away from the clamping arm 436, and the electrical connector 712 is connected to and conducted with the cable 130. Therefore, when the cable 130 is connected to and conducted with the electrical connector 712, and the electrical connector 712 is connected to and conducted with the PCB, the cable 130 of the optical-electrical composite cable 100 is connected to the component on the PCB.

In a specific embodiment, the conductive sheet 710 may be a conductive elastic spring sheet. The electrical connector 712 is a part of the conductive elastic spring sheet, and the electrical connector 712 may be clamped into the slot 720 corresponding to the outer housing 410 corresponding to the adapter. The electrical connector 712 is in contact with the conductive terminal, to implement electrical connection to the cable 130 in the optical-electrical composite cable 100. The conductive connector 713 is also a part of the conductive elastic spring sheet. The conductive connector 713 may be in contact with a copper area on the PCB, and is fastened through tin soldering. In an implementation, there is one pair of conductive elastic spring sheets of the adapter, that is, connection between an optical-electrical composite cable 100 and a PCB is implemented.

Embodiment 4

A difference between an adapter in Embodiment 4 and the adapter in Embodiment 3 lies in that: there are two adapters 700 that are symmetrically distributed, and the two adapters 700 are disposed back to back, so that the two slots 760 are coaxially disposed. There are two pairs of conductive sheets 710 of the adapter. Each pair of electrical connectors 712 may be connected to one optical-electrical composite cable 100. Therefore, the adapter can implement connection between the two optical-electrical composite cables 100 and the PCB and connection between optical fibers 110 of the two optical-electrical composite cables. A signal transmission manner of the two symmetrically distributed adapters 700 in the fourth specific implementation is the same as that of the adapters provided in the second specific implementation.

In conclusion, compared with an SC optical fiber connector, the optical-electrical composite connector 400 in this application has no change in an interface size, and may be compatible with a standard SC optical fiber adapter. In addition, the optical-electrical composite connector 400 in this application may transmit only an optical signal or an electrical signal, or may transmit both an optical signal and an electrical signal.

Compared with the SC optical fiber connector, the adapter in this application does not have any change in an interface size, can be directly butted with a standard SC optical fiber connector.

What is disclosed above is merely example embodiments of this application, and certainly is not intended to limit the protection scope of this application. A person of ordinary skill in the art may understand that all or some of processes that implement the foregoing embodiments and equivalent modifications made in accordance with the claims of this application shall fall within the scope of this application.

What is claimed is:

1. An optical-electrical composite connector, comprising:
   a front housing, a through groove extending through the front housing, and a first groove extending in an inner wall of the front housing in the through groove;
   a rear housing, comprising a main body and a clamp connected to a first end of the main body, wherein a first passage extends axially through the clamp, a second groove extends axially in an outer surface of the clamp, the clamp is disposed in the through groove, and the first groove buts the second groove to define an accommodation space, and wherein a first end of the through groove that is disposed away from the main body is an optical port;
   an optical fiber;
   a cable; and
   a conductive terminal, configured to form an electrical port; and
   wherein an opening of the front housing connects to the accommodation space and ambient air, the conductive terminal is in the opening of the front housing, the optical fiber passes through the main body and extends to the optical port along the first passage, the cable passes through the main body and is fixedly accommodated in the accommodation space, and the cable is electrically connected to the conductive terminal.

2. The optical-electrical composite connector according to claim 1, wherein the clamp further comprises a flange, the flange is disposed on a side of the rear housing that defines the second groove that is farthest from the main body, and the cable is accommodated in the accommodation space and abuts against the flange.

3. The optical-electrical composite connector according to claim 1, wherein the main body comprises a bottom wall, two first side walls are axially disposed on a periphery of the bottom wall, and a second side wall is connected between the two first side walls, and wherein the bottom wall, the two first side walls, and the second side wall define a receiving space;
   wherein the main body comprises a sleeve disposed in the receiving space, a first channel is butted to and communicates with the sleeve, a gap is formed between an outer surface of the sleeve and an inner surface of the first side wall, and the receiving space comprises the gap and a concave cavity adjacent to the gap;
   wherein the optical fiber passes through the first passage after sequentially passing through the concave cavity and the sleeve; and
   wherein a through hole extends through the second side wall, and the cable is fastened in the accommodation space after sequentially passing through the concave cavity, the gap, and the through hole.

4. The optical-electrical composite connector according to claim 3, wherein the bottom wall comprises a support body, the support body is located in the gap, and the cable is supported on the support body.

5. The optical-electrical composite connector according to claim 3, wherein:
the conductive terminal comprises a conductor and two clamping arms connected to the conductor and disposed at a spacing; and
the conductive terminal is accommodated in the opening in a manner that the two clamping arms clamp the cable, and the cable is conducted to the electrical port using the conductor.

6. The optical-electrical composite connector according to claim 3, further comprising:
a ferrule assembly, wherein the ferrule assembly comprises a first ferrule column, a ferrule tail handle, and an elastic member;
the ferrule tail handle comprises a second ferrule column and a convex ring located at a front end of the second ferrule column;
a first end of the first ferrule column is fastened in a central hole of the convex ring, a protrusion extends from an inner surface of the front housing and protrudes into the through groove, and a clamping position is defined with respect to an inner surface of the first passage;
the first ferrule column is connected to the second ferrule column, the first end that is of the first ferrule column and that is physically spaced from the second ferrule column is the optical port, and the elastic member surrounds the second ferrule column; and
the optical-electrical composite connector is configured in a manner that, when the clamp is mounted in the through groove, and the ferrule assembly is mounted in the first passage, the first ferrule column is accommodated in the first passage, a second end of the first ferrule column extends out of the front housing, the second ferrule column is accommodated in the first passage, the elastic member is elastically limited between the first ferrule column and the clamping position, and the elastic member pushes the first ferrule column to abut against the protrusion, and the optical fiber sequentially passes through the concave cavity, the sleeve, and the second ferrule column, and extends into the first ferrule column.

7. The optical-electrical composite connector according to claim 6, further comprising:
an elastic sheath, wherein a clamping hole extends in the elastic sheath;
wherein the main body comprises a convex edge, and the convex edge is clamped into the clamping hole in a manner that the rear housing is connected to the elastic sheath; and
wherein a second passage extends through the elastic sheath, the optical fiber sequentially extends through the second passage, the concave cavity, the sleeve, and the ferrule assembly, the cable sequentially extends through the second passage, the concave cavity, the gap, and the through hole, and is fastened in the accommodation space.

8. The optical-electrical composite connector according to claim 7, wherein the optical fiber and the cable form an optical-electrical composite cable, the optical-electrical composite cable further comprises a coating layer and a cable sleeve, wherein the coating layer is sleeved over the optical fiber, and the cable sleeve is sleeved over the coating layer and the cable; and
wherein the optical-electrical composite connector is configured in a manner that, when the clamp is clamped into the through groove and the ferrule assembly is disposed in the first passage, the coating layer is exposed in the concave cavity, and the optical fiber is exposed in the first ferrule column.

9. The optical-electrical composite connector according to claim 8, further comprising:
a buckle, wherein a buckle hole extends in a first end of the main body that is farthest from the clamp, the buckle is clamped into the buckle hole to fasten the optical-electrical composite cable to the rear housing, and after the rear housing is connected to the elastic sheath, the buckle is accommodated in the elastic sheath.

10. The optical-electrical composite connector according to claim 9, wherein a plurality of annular grooves extends in an outer surface of a first end that is of the elastic sheath and that is farthest from the elastic sheath, the plurality of annular grooves are arranged at a spacing, and glue fills the receiving space in the form of a colloid.

11. The optical-electrical composite connector according to claim 7, further comprising:
an optical fiber protection tube sleeved over the optical fiber, wherein the optical fiber protection tube is accommodated in the receiving space, and a first end that is of the optical fiber protection tube and that faces the elastic sheath is disposed between a cable sleeve and an inner surface of the receiving space, and a second end that is of the optical fiber protection tube that is farthest from the elastic sheath is fastened to a surface that defines the receiving space.

12. A connector assembly, comprising:
an adapter; and
an optical-electrical composite connector, comprising:
a front housing, a through groove extending through the front housing, and a first groove extending in an inner wall of the front housing in the through groove;
a rear housing, comprising a main body and a clamp connected to a first end of the main body, wherein a first passage extends axially through the clamp, a second groove extends axially in an outer surface of the clamp, the clamp is disposed in the through groove, and the first groove buts the second groove to define an accommodation space, and wherein a first end of the through groove that is disposed away from the main body is an optical port;
an optical fiber;
a cable; and
a conductive terminal, configured to form an electrical port; and
wherein an opening of the front housing connects to the accommodation space and ambient air, the conductive terminal is in the opening of the front housing, the optical fiber passes through the main body and extends to the optical port along the first passage, the cable passes through the main body and is fixedly accommodated in the accommodation space, and the cable is electrically connected to the conductive terminal.

13. The connector assembly according to claim 12, wherein the clamp further comprises a flange, the flange is disposed on a side of the rear housing that defines the second groove that is farthest from the main body, and the cable is accommodated in the accommodation space and abuts against the flange.

14. The connector assembly according to claim 12, wherein the main body comprises a bottom wall, two first side walls axially disposed on a periphery of the bottom wall, and a second side wall connected between the two first side walls, and the bottom wall, the two first side walls, and the second side wall define a receiving space;
   wherein the main body further comprises a sleeve disposed in the receiving space, the first channel is butted to and communicates with the sleeve, a gap is between an outer surface of the sleeve and an inner surface of the first side wall, and the receiving space comprises the gap and a concave cavity adjacent to the gap;
   wherein the optical fiber passes through the first passage after sequentially passing through the concave cavity and the sleeve; and
   wherein a through hole extends in the second side wall, and the cable is fastened in the accommodation space after sequentially passing through the concave cavity, the gap, and the through hole.

15. The connector assembly according to claim 14, wherein the bottom wall comprises a support body, the support body is located in the gap, and the cable is supported on the support body.

16. The connector assembly according to claim 14, wherein the conductive terminal comprises a conductor and two clamping arms connected to the conductor and disposed at a spacing; and
   wherein the conductive terminal is accommodated in the opening in a manner that the two clamping arms clamp the cable, and the cable is conducted to the electrical port by using the conductor.

17. The connector assembly according to claim 14, wherein the optical-electrical composite connector further comprises:
   a ferrule assembly, comprising a first ferrule column, a ferrule tail handle, and an elastic member;
   wherein the ferrule tail handle comprises a second ferrule column and a convex ring located at a front end of the second ferrule column;
   wherein a first end of the first ferrule column is fastened in a central hole of the convex ring, a protrusion extends from an inner surface of the front housing an protrudes into the through groove, and an inner surface of the first passage defines a clamping position;
   wherein the first ferrule column is connected to the second ferrule column, the first end that is of the first ferrule column and that is farthest from the second ferrule column is the optical port, and the elastic member surrounds the second ferrule column;
   wherein the optical-electrical composite connector is configured in a manner that, when the clamp is mounted in the through groove, and the ferrule assembly is mounted in the first passage, the first ferrule column is accommodated in the first passage, a second end of the first ferrule column extends out of the front housing, the second ferrule column is accommodated in the first passage, the elastic member is elastically limited between the first ferrule column and the clamping position, and the elastic member pushes the first ferrule column to abut against the protrusion; and
   wherein the optical fiber sequentially passes through the concave cavity, the sleeve, and the second ferrule column, and extends into the first ferrule column.

18. The connector assembly according to claim 17, wherein the optical-electrical composite connector further comprises:
   an elastic sheath, wherein a clamping hole extends in the elastic sheath;
   wherein the main body comprises a convex edge, and the convex edge is clamped into the clamping hole in a manner that the rear housing is connected to the elastic sheath; and
   wherein a second passage extends through the elastic sheath, the optical fiber sequentially extends through the second passage, the concave cavity, the sleeve, and the ferrule assembly, and the cable sequentially extends through the second passage, the concave cavity, the gap, and the through hole, and is fastened in the accommodation space.

19. The connector assembly according to claim 12, wherein the adapter comprises an inner cavity and a mounting opening, and a cable hole extends through a side wall that defines the inner cavity;
   a first end of an electrical connector is accommodated in the inner cavity, and a second end of the electrical connector passes through the cable hole; and
   a slot extends in a bottom wall that defines the inner cavity and that is opposite to the mounting opening, an optical connector is disposed in the slot, and the front housing is configured to be inserted into the inner cavity through the mounting opening in a manner that the optical fiber is configured to be inserted into the slot to connect to the optical connector, and the cable is configured to be conducted to the outside by using the electrical connector.

20. The connector assembly according to claim 19, wherein the adapter comprises an inner cavity and a conductive sheet, and the conductive sheet comprises the electrical connector and a conductive connector;
   wherein a mounting opening extends in a sidewall that defines the inner cavity of the adapter, a slot extends in a bottom wall that defines the inner cavity of the adapter, and an outer surface of the side wall defines a mounting position;
   wherein the electrical connector is clamped into the slot, the conductive connector is mounted at the mounting position, and the optical connector is disposed in the slot; and
   wherein the front housing is configured to be inserted into the inner cavity in a manner that the optical fiber is inserted into the slot to connect to the optical connector, and the cable is connected to the electrical connector and is conducted to the outside by using the conductive connector.

* * * * *

UNITED STATES PATENT AND TRADEMARK OFFICE
CERTIFICATE OF CORRECTION

PATENT NO. : 12,066,668 B2
APPLICATION NO. : 17/807800
DATED : August 20, 2024
INVENTOR(S) : Qi et al.

It is certified that error appears in the above-identified patent and that said Letters Patent is hereby corrected as shown below:

In the Specification

In Column 8, Line 11, after "fiber" delete "no," and insert -- 110, --.

In Column 8, Line 13, after "fiber" delete "no." and insert -- 110. --.

In Column 8, Line 31, after "fiber" delete "no" and insert -- 110 --.

In Column 8, Line 32, after "fiber" delete "no" and insert -- 110 --.

In Column 8, Lines 33-34, after "fiber" delete "no." and insert -- 110. --.

In Column 8, Line 41, after "fiber" delete "no" and insert -- 110 --.

In Column 8, Line 61, after "fiber" delete "no," and insert -- 110, --.

In Column 9, Line 56, after "fiber" delete "no" and insert -- 110 --.

In Column 9, Line 66, after "fiber" delete "no" and insert -- 110 --.

In Column 11, Line 62, after "fiber" delete "no" and insert -- 110 --.

In Column 12, Line 16, after "fiber" delete "no" and insert -- 110 --.

In Column 12, Line 21, after "fiber" delete "no" and insert -- 110 --.

In Column 12, Line 23, after "fiber" delete "no" and insert -- 110 --.

In Column 12, Line 38, after "fiber" delete "no," and insert -- 110, --.

Signed and Sealed this
First Day of October, 2024

Katherine Kelly Vidal
*Director of the United States Patent and Trademark Office*

In Column 13, Line 26, after "fiber" delete "no" and insert -- 110 --.

In Column 13, Line 46, after "fiber" delete "no" and insert -- 110 --.

In Column 13, Line 64, after "fiber" delete "no" and insert -- 110 --.

In Column 14, Line 16, after "fiber" delete "no" and insert -- 110 --.

In Column 14, Line 25, after "fiber" delete "no" and insert -- 110 --.

In Column 14, Line 32, after "fiber" delete "no" and insert -- 110 --.

In Column 14, Line 44, delete "no is" and insert -- 110 is --.

In Column 14, Line 45, after "fiber" delete "no" and insert -- 110 --.

In Column 14, Line 47, after "fiber" delete "no" and insert -- 110 --.

In Column 14, Line 63, after "fiber" delete "no" and insert -- 110 --.

In the Claims

In Column 14, Line 64, after "fiber" delete "no" and insert -- 110 --.

In Column 14, Line 65, after "fiber" delete "no" and insert -- 110 --.

In Column 14, Line 67, after "fiber" delete "no" and insert -- 110 --.

In Column 15, Line 1, after "fiber" delete "no" and insert -- 110 --.

In Column 15, Line 18, after "fiber" delete "no" and insert -- 110 --.

In Column 15, Line 36, after "fiber" delete "no" and insert -- 110 --.

In Column 17, Line 16, after "fiber" delete "no" and insert -- 110 --.

In Column 17, Line 44, after "fiber" delete "no" and insert -- 110 --.

In Column 18, Line 22, after "fiber" delete "no" and insert -- 110 --.

In Column 19, Line 9, after "fiber" delete "no" and insert -- 110 --.